Figure 1:
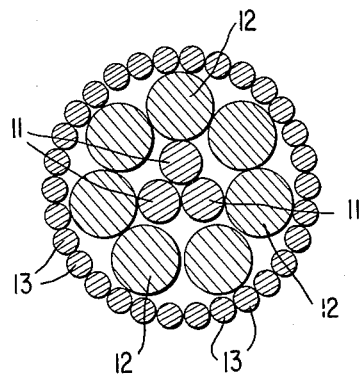

Jan. 2, 1962 — R. MASSOT ET AL — 3,015,205
AXIAL CARRIER STEEL CABLE WITH A PLURALITY OF
WIRES FOR A SUBMARINE CABLE
Filed Jan. 16, 1958 — 2 Sheets-Sheet 1

INVENTORS
ROGER MASSOT
IVAN PIERRE EYRAUD

BY Paul D. Craig Jr.
ATTORNEYS

Jan. 2, 1962    R. MASSOT ET AL    3,015,205
AXIAL CARRIER STEEL CABLE WITH A PLURALITY OF
WIRES FOR A SUBMARINE CABLE
Filed Jan. 16, 1958    2 Sheets-Sheet 2

INVENTORS
ROGER MASSOT
IVAN PIERRE EYRAUD

BY *Paul D. Craig Jr.*
ATTORNEYS

United States Patent Office 3,015,205
Patented Jan. 2, 1962

3,015,205
AXIAL CARRIER STEEL CABLE WITH A PLURALITY OF WIRES FOR A SUBMARINE CABLE
Roger Massot and Ivan Pierre Eyraud, Lyon, France, assignors to Compagnie Generale d'Electricite, Paris, France
Filed Jan. 16, 1958, Ser. No. 709,257
14 Claims. (Cl. 57—148)

The present invention relates to submarine cables without armature of the coaxial type of which the central conductor is constituted by a steel cable having several wires covered with a conductive band, tape or strip. In this type of construction, the steel cable composed of several twisted strands serves as carrier or support for the entire cable whereas the conductive band is utilized to transmit the high frequency current.

A submarine cable, as is well known, by reason of its submersion in the water, must provide a great resistance to tension and must also be anti-gyratory under the action of the weight of the submerged length thereof. The gyration of the cable cannot be tolerated; for it leads to deteriorations of and brings about damage to the conductors, the insulation and the repeaters interconnected in the cable.

The present invention has as its primary object, in connection with submarine cable having a central steel carrier cable, to impart such qualities to the cable which is constituted by plurality of wires or strands as to give it the flexibility necessary for the winding or twisting thereof.

Accordingly, it is an object of the present invention to provide an axial steel carrier or support cable having a plurality of helically wound or twisted wires or strands for a submarine cable which is characterized in that the helix angle or winding angle is the same for all the wires, with the possible exception eventually of an axial wire the winding angle of which is zero, and in that the assembly of the wires satisfies, in any transverse cross-section taken anywhere along its length, the following condition:

$$\sum_{i=1}^{i=n} f_i D_i = 0 \qquad (1)$$

in which $i$ is an integer between 1 and $n$,
$n$ is the total number of wires of the cable,
$f_i$ is the value of the mechanical load applied to the wire in question, having an index $i$, and
$D$ is the average or mean winding diameter of a wire.

It has been demonstrated that a wire of a cable supporting the load $f$ and twisted with a winding angle $\alpha$ is submitted to two forces, one of which is $$\frac{f}{\cos \alpha}$$

which is the tensional force exerted on the wire, and the other of which is $f \cdot \tan \alpha$ which produces a couple $m$ of gyration equal to $$f \cdot \frac{D}{2} \tan \alpha$$

If it is assumed that $p$ is the winding pitch of the wire corresponding to a length of the wire equal $l$, and if the cable is to be anti-gyratory, one obtains $$\frac{dp}{p} = \frac{dL}{L} \qquad (2)$$

wherein $L$ is the length of a portion of the cable, and $$\frac{dL}{L}$$

is the relative increase in length of the cable which is subjected to the total tensional force F. It may be readily demonstrated by calculation that $$\frac{dl}{l} = \frac{2 \cos^2 \alpha}{3 - \cos^2 \alpha} \frac{dL}{L} = \varphi(\alpha) \qquad (3)$$

In the same wire in which the forces are proportional to the elongations thereof, one obtains $$\frac{f}{ES} = \frac{dl}{l} = \varphi(\alpha) \qquad (4)$$

E being the modulus of elasticity of the metal and S the cross-section of the wire under consideration.

In order that the cable be able to profit to a maximum from the resistance against rupture or breakage exhibited by each wire which is relatively very great, it is necessary to uniformly distribute the load on each of the wires or strands. This condition of equidistribution of forces means that $$\frac{f}{ES} = \text{constant} \qquad (5)$$

and consequently that $\alpha$ must be the same for all the wires.

It has been shown hereinabove that each wire loaded with a load or force $f$ produces a couple of gyrations equal to $$m = f \times \frac{D}{2} \times \tan \alpha \qquad (6)$$

In order that a steel cable which is used as carrier be anti-gyratory, it is, therefore, necessary that in each transverse cross-section, no matter where taken, the sum of the elementary couples be zero; since the winding or twisting angle $\alpha$ is the same for all the wires it is therefore necessary that $$\sum_{i=1}^{i=n} f_i D_i = 0 \qquad (7)$$

Accordingly, it is an object of the present invention to provide a stranded steel cable serving as support or carrier for a submarine cable which has anti-gyratory properties.

It is another object of the present invention to provide a submarine cable in which damage to the conductors, the insulation and repeaters, due to tensional and gyratory forces, are minimized as much as possible.

It is still another object of the present invention to provide a stranded central support for a submarine cable having sufficient flexibility for the winding thereof.

Another object of the present invention is the provision of a submarine cable which is sturdy, easy to manufacture, and which has a very long life irrespective of the submerged length thereof.

Figure 3:
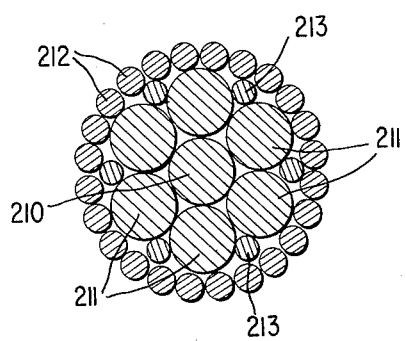
Figure 2:
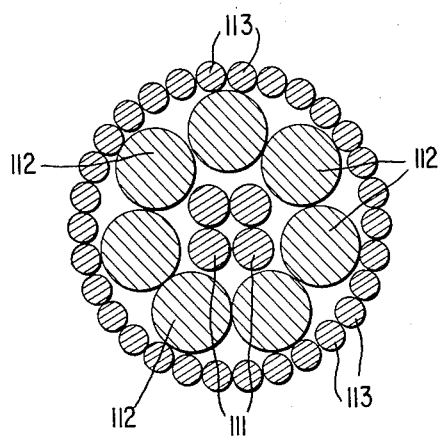
Figure 4:
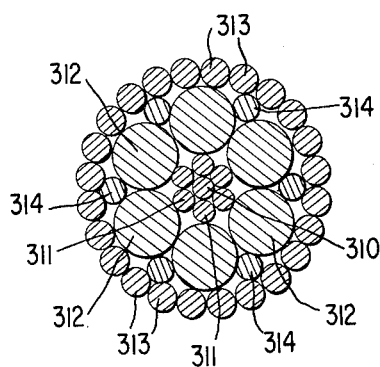
Figure 6:
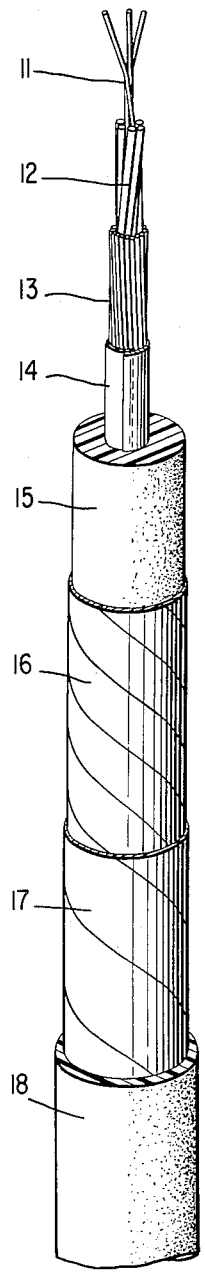
Figure 5:
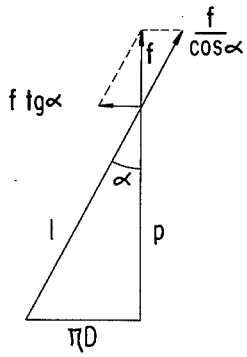

These and other objects, features and advantages of the present invention will become more obvious from the following description when taken in connection with the accompanying drawing which shows, for purposes of illustration only, several embodiments in accordance with the present invention and wherein FIGURE 1 is a transverse cross-sectional view of a central axial cable in accordance with the present invention adapted to support thereon a submarine cable, FIGURE 2 is a transverse cross-sectional view of another embodiment of the central cable for a submarine cable in accordance with the present invention, FIGURE 3 is a transverse cross-sectional view of still another embodiment of a central cable for a submarine cable in accordance with the present invention, FIGURE 4 is a transverse cross-sectional view of still a further modified embodiment of a central axial cable for a submarine cable in accordance with the present invention, FIGURE 5 is a diagram indicating the force distribution in a cable in accordance with the present invention, and FIGURE 6 is a perspective view of a completely assembled submarine cable having a stranded support cable formed of a plurality of twisted steel wires in accordance with the present invention.

Referring now to the drawing wherein like reference numerals are used throughout the various views to designate like parts, and more particularly to FIGURE 6, which illustrates a submarine cable in accordance with the present invention having a central carrier formed of a plurality of layers of twisted wires as shown in FIGURE 1, reference numeral 11 designates three wires of unit diameter δ and with the cross sections thereof adjacent or touching each other (FIGURES 1 and 6). A second layer of seven wires designated by reference numeral 12 surrounds the central layer of three wires 11, the second layer of wires 12 each having a diameter equal to 1.63δ. A third layer of thirty wires, designated by reference numeral 13 and having a diameter of 0.61δ, surrounds the seven wires 12 of the second layer.

Thus, reference numerals 11–13 designate three layers of steel cable which constitute the carrier or support for the submarine cable. Reference numeral 14 (FIGURE 6) designates a strip of copper closed upon itself in the manner of a tube longitudinally of the cable. An insulating layer 15, for example, of polyethylene, surrounds the copper strip 14, which is followed by a spiral winding 16 of six bands or strips of copper having juxtaposed borders or edges. A so-called anti-teredo strip or band 17 of copper is helicoidally wound thereon with the edges thereof joined to protect the cable against attack from teredo mollusks. An external cover 18 of any suitable material, for example, polyethylene, surrounds the submarine cable.

While the carrier 11–13 of FIGURE 6 conforms to that shown in detail in FIGURE 1, it is understood the carrier for the cable might also be made as disclosed in connection with FIGURES 2–4. Moreover, in FIGURE 1 as well as in the other embodiments of FIGURES 2–4, the direction of winding of each layer is alternated for successive layers thereof.

FIGURE 2 illustrates a modified embodiment, similar to FIGURE 1, of a central supporting steel cable in which the center layer consists of four wires designated by reference numeral 111 having a unitary diameter equal to δ. A second layer of seven wires designated by reference numeral 112 of diameter equal to 1.84δ surrounds the first layer of four wires 111, and a third layer of thirty wires 113 having a diameter equal to ⅔δ surrounds the second layer of seven wires 112.

FIGURE 3 shows an embodiment of a central steel cable in which the center wire having a diameter equal to δ and designated by reference numeral 210 has a value of $\alpha=0$. A first layer of six wires designated by reference numeral 211 surrounds the single central wire 210, the six wires 211 of the first layer also having a diameter equal to unity δ. A second layer of twenty-four wires having a diameter equal to 0.422δ and designated by reference numeral 212 surround the six wires 211 of the first layer.

As may be seen, a central conductor or wire 210 is provided for FIGURE 3 which does not satisfy the condition of constancy of $\alpha$; on the other hand, in order to increase the rigidity and sturdiness of the cables by reducing the empty spaces, wires of the same type are inserted therein which are called "filler" wires and which deviate as little as possible from the condition of $\alpha$=constant. The wires of which six are provided between the first and second layer filler are designated in FIGURE 3 by reference numeral 213 and have a diameter equal to 0.353δ.

FIGURE 4 shows again a central steel cable having at the center thereof a single wire of diameter δ for which $\alpha$ is equal 0 and designated by reference numeral 310. A first layer of six wires 311 also having a diameter equal to δ surrounds the central wire 310. A second layer of six wires 312 surrounds the six wires 311 of the first layer, each wire 312 having a diameter equal to 3δ. A third layer of twenty-four wires having a diameter of 1.29δ and designated by reference numeral 313 surrounds the second layer of wires 312. Again, filler wires 314, six in number, are inserted into the empty spaces, each wire 314 having a diameter equal to 1.09δ and being disposed between the second and third layer.

In the embodiments of FIGURES 3 and 4, the relative cross-section occupied by the central wire 210 or 310 and the filler wires 213 and 314 respectively remains relatively small with respect to those of the principal or main wires. It is, therefore, possible to consider the resistance to tension thereof as remaining in the neighborhood of optimum resistance.

FIGURE 5 illustrates the helix developed in the central fiber of a wire of length $\alpha$; the forces which act on or within this wire and which have been considered hereinabove in the mathematical analysis are indicated in this figure.

While we have shown and described several embodiments in accordance with the present invention, it is understood that the same is not limited thereto but is susceptible of many changes and modifications within the spirit of the present invention, and we therefore do not wish to be limited thereto but intend to cover all such changes and modifications as encompassed by the appended claims.

We claim:

1. A central carrier cable of a plurality of helically wound wires and adapted to support thereon a submarine cable, comprising a first layer of a first predetermined number of helically wound wires each having a first diametric dimension, and at least a second layer of a second predetermined number of helically wound wires each of a second diametric dimension, the helix angle of all of said wires being the same and each wire being contiguous along the periphery thereof to at least two adjacent wires of the same layer, the wires of said first and second layers being wound in opposite directions, said cable providing uniform distribution of axial cable load on each of said wires at each transverse section of said cable and the sum at each said section of the couples due to said load on said wires being substantially zero whereby the forces tending to twist the cable due to the application of said load are minimized.

2. A central carrier cable according to claim 1, further comprising filler wires arranged in the empty spaces between said first-mentioned wires, the total cross section of said filler wires being relatively small with respect to the total cross section of said first-mentioned wires.

3. A central carrier cable having a plurality of helically wound wires and adapted to support thereon a submarine cable comprising a first inner layer of a first predetermined number of helically wound wires each of a first diametric dimension and with the outer surface of each wire contiguous to at least those of two others, a second intermediate layer of a second predetermined number of helically wound wires each of a second diametric dimension and with the outer surface of each wire contiguous to at least those of two others of said second layer, and a third outer layer of a third predetermined number of helically wound wires each of a third predetermined diametric dimension and with the outer surface of each wire contiguous to at least those of two others of said third layer, the helix angle of all of said wires of said layers being the same, said intermediate layer having the wires therein wound in a different direction from the winding direction of said first and third layers, said wires being substantially uniformly loaded when a load is applied to said cable and the sum of all twisting couples at any transverse cross section being substantially zero whereby the cable is substantially free of gyratory or twisting forces when placed under load.

4. A central carrier cable according to claim 3, wherein said first layer comprises three wires, said second layer seven wires, and said third layer thirty wires.

5. A central carrier cable according to claim 4, wherein said three wires have unit diameter, said seven wires have a diameter equal to 1.63 unit diameter and said thirty wires have a diameter equal to 0.61 unit diameter.

6. A central carrier cable according to claim 3, wherein said first layer includes four wires, said second layer seven wires, and said third layer thirty wires.

7. A central carrier cable according to claim 6, wherein said four wires have unit diameter, said seven wires have a diameter equal to 1.84 unity and said thirty wires a diameter equal to ⅔ unit diameter.

8. A central carrier cable according to claim 1, further comprising a central wire of unity diameter, said first layer including six wires of unit diameter, and said second layer including twenty-four wires of diameter equal to 0.422 unit diameter.

9. A central carrier cable according to claim 8, further comprising six filler wires disposed between said first and second layer of a diameter equal to 0.353 unit diameter.

10. A central carrier cable according to claim 3, further comprising a central wire of unit diameter, said first layer including six wires also of unit diameter, said second layer including six wires of diametric dimension equal to three unit diameters and said third layer including twenty-four wires of 1.29 unit diameter.

11. A central carrier cable according to claim 10, further comprising six filler wires between said second and third layer of 1.09 unit diameter.

12. A central carrier cable having a plurality of helically wound steel wires for a submarine cable, the helix angle of all of said wires being essentially the same, and the wire assembly of constant helix angle satisfying in any transverse cross section thereof the condition of $$\sum_{i=1}^{i=n} f_i D_i = 0$$

where $i$ is an integer between 1 and $n$, $n$ is the total number of wires in the cable, $f_1$ is the value of the mechanical load applied to the wire of index $i$, and D is the mean winding diameter of a wire.

13. Cable apparatus according to claim 1, further including around said central carrier cable a pair of coaixal metal layers of good electrical conductivity and an electrically insulating layer intermediate said metal layers.

14. Cable apparatus according to claim 3, further including around said central carrier cable a pair of coaxial copper layers and an electrically insulating layer intermediate said copper layers and a further insulating layer surrounding the outer copper layer.

References Cited in the file of this patent

UNITED STATES PATENTS

| | | |
|---|---|---|
| 315,077 | Seale | Apr. 7, 1885 |
| 416,189 | Stone | Dec. 3, 1889 |
| 1,691,869 | Fowle | Nov. 13, 1928 |
| 1,904,116 | Baum | Apr. 18, 1933 |
| 2,779,149 | Schuller | Jan. 29, 1957 |

FOREIGN PATENTS

| | | |
|---|---|---|
| 25,557 | Great Britain | of 1907 |